(12) United States Patent  (10) Patent No.: US 8,850,085 B2
Manula et al.  (45) Date of Patent: Sep. 30, 2014

(54) BANDWIDTH AWARE REQUEST THROTTLING

(71) Applicant: Oracle International Corporation, Redwood City, CA (US)

(72) Inventors: Brian Edward Manula, Oslo (NO); Haakon Ording Bugge, Oslo (NO)

(73) Assignee: Oracle International Corporation, Redwood Shores, CA (US)

( * ) Notice: Subject to any disclaimer, the term of this patent is extended or adjusted under 35 U.S.C. 154(b) by 44 days.

(21) Appl. No.: 13/777,564

(22) Filed: Feb. 26, 2013

(65) Prior Publication Data

US 2014/0244866 A1  Aug. 28, 2014

(51) Int. Cl.
*G06F 13/28* (2006.01)

(52) U.S. Cl.
CPC ...................................... *G06F 13/28* (2013.01)
USPC .......................................................... 710/27

(58) Field of Classification Search
USPC .......................................................... 710/27
See application file for complete search history.

(56) References Cited

U.S. PATENT DOCUMENTS

| | | | |
|---|---|---|---|
| 6,009,097 A * | 12/1999 | Han | 370/395.52 |
| 6,459,698 B1 | 10/2002 | Acharya | |
| 6,563,790 B1 | 5/2003 | Yu et al. | |
| 6,741,559 B1 | 5/2004 | Smeulders et al. | |
| 6,789,143 B2 | 9/2004 | Craddock et al. | |
| 6,917,987 B2 | 7/2005 | Parthasarathy et al. | |
| 7,023,799 B2 * | 4/2006 | Takase et al. | 370/230.1 |
| 7,136,353 B2 | 11/2006 | Ha et al. | |
| 7,191,207 B2 * | 3/2007 | Blount et al. | 709/200 |
| 7,330,918 B2 | 2/2008 | Yamamoto et al. | |
| 7,496,698 B2 | 2/2009 | Biran et al. | |
| 7,609,636 B1 | 10/2009 | Mott | |
| 7,742,497 B2 | 6/2010 | Ganti et al. | |
| 7,769,015 B2 | 8/2010 | Huang et al. | |
| 7,782,805 B1 | 8/2010 | Belhadj et al. | |
| 7,817,634 B2 | 10/2010 | Coffman et al. | |
| 7,830,919 B1 | 11/2010 | Thompson | |
| 7,899,050 B2 | 3/2011 | Craddock et al. | |
| 7,965,635 B1 * | 6/2011 | Regan et al. | 370/235 |
| 8,244,946 B2 | 8/2012 | Gupta et al. | |
| 8,255,475 B2 | 8/2012 | Kagan et al. | |
| 8,259,576 B2 | 9/2012 | Lee et al. | |
| 8,259,746 B2 | 9/2012 | Lo et al. | |
| 8,274,976 B2 | 9/2012 | Aloni et al. | |
| 8,296,386 B1 | 10/2012 | Micalizzi, Jr. | |
| 8,635,256 B2 * | 1/2014 | Chinner et al. | 707/822 |
| 2001/0036185 A1 | 11/2001 | Dempo | |
| 2003/0101158 A1 | 5/2003 | Pinto et al. | |
| 2004/0062259 A1 * | 4/2004 | Jeffries et al. | 370/412 |

(Continued)

*Primary Examiner* — Chun-Kuan Lee
(74) *Attorney, Agent, or Firm* — Osha Liang LLP

(57) ABSTRACT

A method for managing bandwidth of a bus connecting a peripheral device to a host system includes sending, over the bus, a first read request to the host system, incrementing a pending read counter by an amount corresponding to the requested data, receiving, in response to sending the first read request, at least a portion of the requested data from the host system, decrementing the pending read counter by an amount corresponding to the at least the portion of the requested data, and comparing the counter and a threshold to obtain a result. Based on the result, a scheme is selected for managing the bandwidth of the bus. The scheme specifies a ratio of read requests and write requests to be sent on the bus. The method further includes sending, based on the scheme, a second request that is a write request or a second read request.

20 Claims, 6 Drawing Sheets

(56) References Cited

U.S. PATENT DOCUMENTS

| | | |
|---|---|---|
| 2005/0018669 A1 | 1/2005 | Arndt et al. |
| 2005/0060443 A1 | 3/2005 | Rosner |
| 2005/0135419 A1 | 6/2005 | Pullen et al. |
| 2005/0223118 A1 | 10/2005 | Tucker et al. |
| 2007/0008886 A1 | 1/2007 | Chen et al. |
| 2007/0019665 A1 | 1/2007 | Benveniste |
| 2007/0165672 A1 | 7/2007 | Keels et al. |
| 2007/0223472 A1 | 9/2007 | Tachibana et al. |
| 2007/0223483 A1 | 9/2007 | Huang et al. |
| 2007/0242686 A1 | 10/2007 | Zegers et al. |
| 2008/0140984 A1 | 6/2008 | Shearer |
| 2008/0168194 A1 | 7/2008 | Gregg et al. |
| 2009/0125604 A1 | 5/2009 | Chang et al. |
| 2011/0216648 A1 | 9/2011 | Mehrotra et al. |
| 2012/0239832 A1 | 9/2012 | Subramanian et al. |
| 2012/0290800 A1* | 11/2012 | Krishnan et al. .............. 711/159 |

* cited by examiner

BANDWIDTH AWARE REQUEST THROTTLING

CROSS-REFERENCE TO RELATED APPLICATIONS

The present application contains subject matter that may be related to the subject matter in the following U.S. Patent Applications, which are assigned to a common assignee and are both incorporated by reference in their entirety: U.S. patent application Ser. No. 13/721,671, entitled "DISTRIBUTED QUEUE PAIR STATE ON A HOST CHANNEL ADAPTER" and U.S. patent application Ser. No. 13/721,699, entitled "METHOD AND SYSTEM FOR QUEUE DESCRIPTOR CACHE MANAGEMENT FOR A HOST CHANNEL ADAPTER."

BACKGROUND

Busses are subsystems designed to transfer data between components of a computer. In some cases, those components may include resources of the host system and peripheral devices. The peripheral component interconnect express (PCIe) bus uses a number of parallel unidirectional communication channels to transfer data between the peripheral device and the host system. The peripheral device may access the resources of the host system, including memory by issuing read requests and write requests. The read requests and write requests may be sent on the same set of communication channels. The host system may send data back in response to the read requests.

The Infiniband® network includes nodes that communicate through a channel-based switched fabric. (Infiniband® is a registered trademark of Infiniband Trade Association, located in Beaverton, Oreg.). For example, the nodes may be a host, an input/output subsystem, or a router, which connects to another network. The switched fabric is made of a collection of switches, routers, and/or links that connect a set of channel adapters. The channel adapters form an interface between the switched fabric and the nodes. The channel adapter of the host is referred to as a host channel adapter. The channel adapter of an I/O subsystem is referred to as a target channel adapter. The host channel adapter may be a peripheral device, which communicates with the host via a PCIe bus.

SUMMARY

In general, in one aspect, embodiments relate to a method for managing bandwidth of a bus connecting a peripheral device to a host system. The method includes the peripheral device sending, over the bus, a first request to the host system. The first request includes a first read request identifying requested data to be read from a memory of the host system. The method further includes incrementing, in response to sending the first read request, a pending read counter by an amount corresponding to the requested data, receiving, in response to sending the first read request, at least a portion of the requested data from the host system, decrementing, in response to receiving the at least the portion of the requested data, the pending read counter by an amount corresponding to the at least the portion of the requested data, and comparing the counter and a threshold to obtain a result. Based on the result, a scheme is selected for managing the bandwidth of the bus. The scheme specifies a ratio of read requests and write requests to be sent on the bus. The method further includes sending, based on the scheme, a second request. The second request is a write request or a second read request. The write request includes data to be written to the memory of the host system.

In general, in one aspect, the invention relates to a peripheral device that includes an endpoint and peripheral device logic. The endpoint includes a pending read counter, a threshold, and an arbitrator. The arbitrator is configured to send a first request over the bus. The first request includes a first read request identifying requested data to be read. The arbitrator is further configured to increment, in response to sending the first read request, the pending read counter by an amount corresponding to the requested data, receive, in response to the first read request and over the bus, at least a portion of the requested data, decrement, in response to sending the read request, the pending read counter by an amount corresponding to the at least the portion of the requested data, compare the pending read counter and the threshold to obtain a result, select, based on the result, a scheme specifying a ratio of read requests and write requests, and send, based on the scheme, a second request. The second request is a write request or a second read request. The write request includes data to be written. The peripheral device logic is configured to issue the first read request, the second read request, and the write request to the endpoint.

In general, in one aspect, the invention relates to a system that includes a host system including a computer processor and memory, a bus including a root complex located in the host system and configured to communicate with the host system, and a peripheral device. The peripheral device includes an endpoint and peripheral device logic. The endpoint includes a pending read counter, a threshold, and an arbitrator. The arbitrator is configured to send a first request over the bus. The first request includes a first read request identifying requested data to be read. The arbitrator is further configured to increment, in response to sending the first read request, the pending read counter by an amount corresponding to the requested data, receive, in response to the first read request and over the bus, at least a portion of the requested data, decrement, in response to sending the read request, the pending read counter by an amount corresponding to the at least the portion of the requested data, compare the pending read counter and the threshold to obtain a result, select, based on the result, a scheme specifying a ratio of read requests and write requests, and send, based on the scheme, a second request. The second request is a write request or a second read request. The write request includes data to be written. The peripheral device logic is configured to issue the first read request, the second read request, and the write request to the endpoint.

Other aspects of the invention will be apparent from the following description and the appended claims.

DETAILED DESCRIPTION

Figure 1:
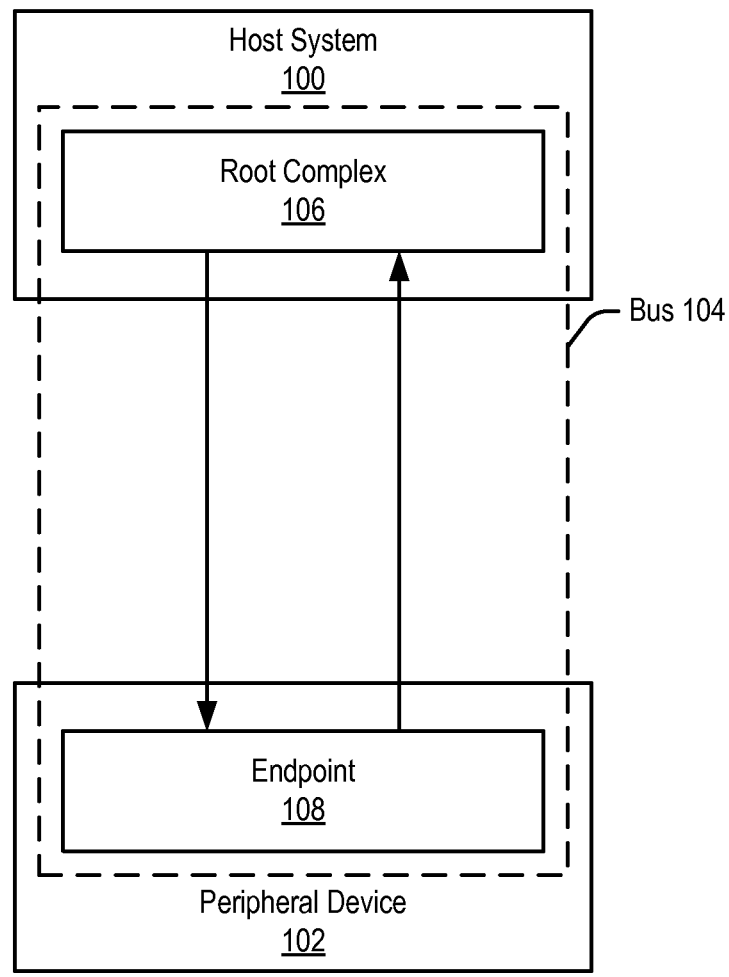
FIG. 1 shows a schematic diagram in accordance with one or more embodiments of the invention.

Specific embodiments of the invention will now be described in detail with reference to the accompanying figures. Like elements in the various figures are denoted by like reference numerals for consistency. Further, the use of "FIG." in the drawings is equivalent to the use of the term "Figure" in the description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for controlling the issue of read requests and write requests on a departing communication channel of a bus based on utilization of a return communication channel of a bus. Specifically, the bus includes at least two unidirectional communication channels (e.g., departing communication channel and a return communication channel) that provide a connection between a host and a peripheral device. For each read request issued on the departing communication channel, embodiments of the invention increment a pending read counter that tracks expected utilization of a return communication channel of the bus. Based on the value of the pending read counter, a scheme is selected that designates whether read requests given a greater priority than write requests, whether write requests are given greater priority than read requests, whether read requests and write requests are given equal priority, or another scheme.

FIG. 1 shows a schematic diagram in accordance with one or more embodiments of the invention. In one or more embodiments of the invention, the system includes a host system (100), a peripheral device (102), and a bus (104). Each of these components is discussed below.

In one or more embodiments of the invention, the host system (100) is any physical computing device. Specifically, the host system (100) includes at least a minimum amount of hardware necessary to process instructions. The host system (100) includes functionality to communicate with one or more peripheral devices (102) via one or more buses (104).

In one or more embodiments of the invention, a peripheral device (102) may include any electronic device or piece of computer hardware that may be connected to the host system (100), but is not integrated into the core architecture of the host system (100). For example, the peripheral device (102) may be an input and/or output device, a storage device, a network interface device, or other device. For example, the peripheral device (102) may be a keyboard, mouse, touchscreen, scanner, graphics card, printer, display, hard drive, flash drive, solid-state drive, optical disk reader, optical disk writer, a router, a WiFi adapter, Bluetooth adaptor, a network interface card and/or another type of device. In one or more embodiments of the invention, the peripheral device (102) may be a host adaptor for a communications link in a high-performance networked computer cluster. For example, in one or more embodiments of the invention, the peripheral device may be a host channel adaptor (HCA) conforming to the InfiniBand® specification.

In one or more embodiments of the invention, the host system (100) and the peripheral device (102) are connected via a bus (104). The bus (104) may include two or more unidirectional communication channels, which include functionality to pass data between host system (100) and the peripheral device (102). A communication channel is a wired or wireless connection between the host and the peripheral device. For example, the bus may be a Peripheral Component Interconnect (PCI) Express bus. In one or more embodiments of the invention, the bus includes at least two unidirectional communication channels (e.g., departing communication channel and a return communication channel) that provide a connection between a host and a peripheral device. The use of the terms "departing" and "return" is from the point of view of the device issuing the read or write requests. For example, if the host issues the read or write requests, then the departing communication channel is a unidirectional channel from the host to the peripheral device; and the return communication channel is a unidirectional channel from the peripheral device to the host. If the peripheral device issues the read or write request, then the departing communication channel is a unidirectional channel from the peripheral device to the host; and the return communication channel is from the host to the peripheral device. In one or more embodiments of the invention, each unidirectional communication channel may include a number of distinct physical connections, which include functionality to send data in parallel.

In one or more embodiments of the invention, the bus (104) includes a root complex (106) located in the host system (100). The root complex (106) is used to connect the bus (104) with a processor and memory of the host system (100). In one or more embodiments of the invention, the root complex (106) may be a discrete or separate device connected to the host system (100). In an alternate embodiment of the invention, the root complex (106) may be integrated with the host system (100). In one or more embodiments of the invention, the root complex (106) may simultaneously connect with multiple busses (104) associated with multiple peripheral devices (102). Alternately, or additionally, the root complex (106) may include functionality to use a single bus (104) to connect with multiple peripheral devices (102).

In one or more embodiments of the invention, the bus (104) includes an endpoint (108) located in the peripheral device (102). The endpoint (108) may be hardware, software, and/or firmware that include components for communication over the bus (104). The endpoint (108) may be a discrete physical device, which provides an access point by which the peripheral device (102) accesses the bus (104). Alternately, the endpoint (108) may be an integrated component of the peripheral device (102) which includes specific functionality to access the bus (104). The endpoint (108) may include components specific to the functioning of the peripheral device (102). In one or more embodiments of the invention, the peripheral device does not include a distinct endpoint (108), but rather the functionality of the endpoint (108) is distributed across multiple components of the peripheral device (102). The functionality and composition of the endpoint (108) is discussed below and in FIG. 2.

Figure 2:
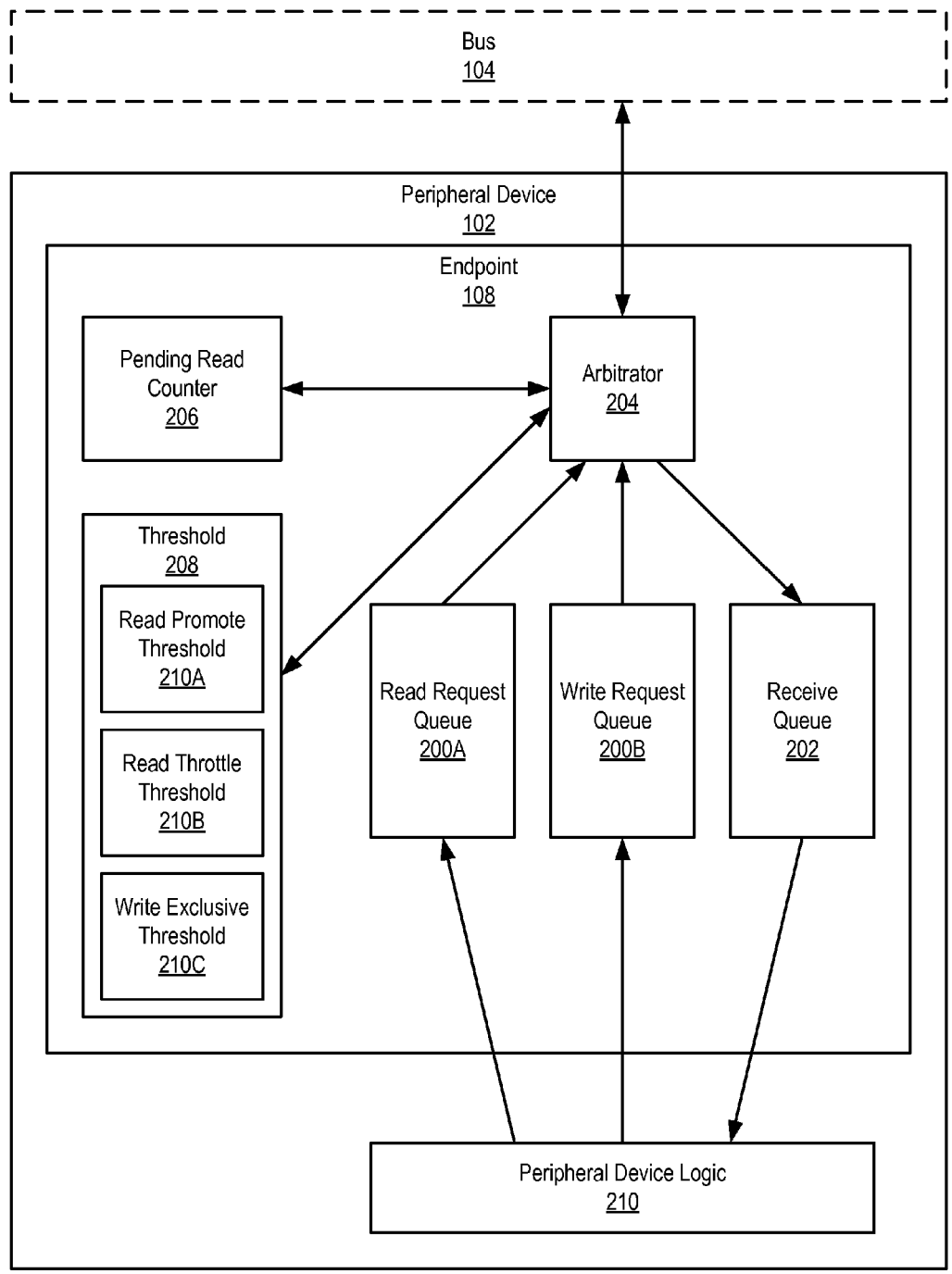
FIG. 2 shows a schematic diagram of a bus endpoint in accordance with one or more embodiments of the invention.

FIG. 2 shows a schematic diagram of an endpoint (108) in accordance with one or more embodiments of the invention. In one or more embodiments of the invention, an endpoint (108) includes request queues (200A, 200B), receive queue (202), an arbitrator (204), a pending read counter (206), and a threshold (208). Each of these components is presented below.

In one or more embodiments of the invention, the queues (e.g., 200A, 200B, 202) each may be a distinct physical memory arrays located in the endpoint (108). Alternately or additionally, the queues (e.g., 200A, 200B, 202) or a portion thereof may each be a section of a larger physical memory. The amount of the memory allocated to the different queues (200A, 200B, 202) (i.e. the size of the queues) may be fixed, or may be changeable based on the needs of the bus (104) or peripheral device (102).

In one or more embodiments of the invention, the read request queue (200A) includes functionality to store read requests that are scheduled to be sent via the bus (104). Specifically, read requests are scheduled to be sent via the departing communication channel and include a request for data on a return communication channel. Read requests from peripheral device (102) may include data packets sent over the bus (104), which include details of a request from the peripheral device logic (210) to read data from memory (not shown) of the host system (not shown). In one or more embodiments of the invention, the read requests are added to the read request queue (200A) by the peripheral device logic (210) and read by an arbitrator (204) in order to be sent over the bus (104). In one or more embodiments of the invention, the read request queue (200A) is first-in, first-out (FIFO). Alternatively or additionally, the read request queue (200A) may be a priority queue based on a different priority scheme than FIFO.

In one or more embodiments of the invention, the write request queue (200B) includes functionality to store write requests that are scheduled to be sent via the bus (104). Specifically, write requests are scheduled to be sent via the departing communication channel and include data for sending on the departing communication channel. Write requests may or may not include or expect a response on the return communication channel, such as that the data was received. For example, write requests from peripheral device (102) may include data packets sent over the bus (104) which include the details of a memory access including the data to be written to the memory of the host system by the peripheral device logic (210). The limitations or specification of the system may require that a single write request be partitioned into multiple portions, where each portion is transmitted in a separate data packet. In one or more embodiments of the invention, the write requests are added to the write request queue (200B) by the peripheral device logic (210) and read by an arbitrator (204) in order to be sent over the bus (104). In one or more embodiments of the invention, like the read request queue (200A), the write request queue (200B) is FIFO. Alternatively or additionally, the read request queue (200A) may be a priority queue based on a different priority scheme than FIFO. In one or more embodiments of the invention, the arbitrator (204) may access the write request queue (200B) according to the same scheme the arbitrator (204) uses to access the read request queue (200A).

In one or more embodiments of the invention, the receive queue (202) is a data structure in which received data is stored. The received data may include data received in response to a read request, a write confirmation, and/or other data. In one or more embodiments of the invention, the requested data in a read request may be received in multiple portions, which are smaller than the size of the original requested data. In one or more embodiments of the invention, the data may be received over the bus (104) by the arbitrator (204), which in turn adds the received data to the receive queue (202). In one or more embodiments of the invention, the receive queue (202) is written over the bus (104) and the arbitrator (204) includes functionality to remove data from the receive queue (202) and pass it to the peripheral device logic (210) once the entire request has been received. Alternately, the peripheral device logic (210) may include functionality to access the receive queue (202) directly.

In one or more embodiments of the invention, the endpoint (108) includes an arbitrator (204). The arbitrator (204) includes functionality to send and receive data over the bus (104). In one or more embodiments of the invention, the arbitrator (204) also includes functionality to choose which data is sent over the bus (104). The data sent may include read requests and write requests. The arbitrator (204) may select the data by accessing either the read request queue (200A) or the write request queue (200B). In one or more embodiments of the invention, the arbitrator (204) may also include functionality to access a pending read counter (206) and a threshold (208) in order to determine whether to access the read request queue (200A) or the write request queue (200B). Additionally, the arbitrator (204) may be able to increment or decrement the pending read counter (206) based on the details of the received data and the read requests sent.

Continuing with FIG. 2, the pending read counter (206) includes functionality to track the amount of data that has been requested via the bus (104), which has not been received. In one or more embodiments of the invention, the pending read counter (206) may be incremented each time a read request is sent by the amount of data requested. Additionally, in one or more embodiments of the invention, the pending read counter (206) is decremented each time a portion of the data requested is received. In one or more embodiments of the invention, the pending read counter (206) represents the amount of data requested to be transmitted on the return communication channel that has not yet been received. In such embodiments, the pending read counter may ensure read requests are only issued when sufficient available bandwidth exists on the return communication channel to transmit the requested data. Alternatively or additionally, in one or more embodiments of the invention, the pending read counter (206) represents the amount of data currently stored in the receive queue (202) by the peripheral device (102). Thus, the pending read counter (206) represents saturation of at least one resource critical to receiving additional data over the bus (104).

In one or more embodiments of the invention, the threshold (208) is at least one value defining when to transition between schemes (discussed below). In one or more embodiments of the invention, the threshold (208) may include a number of sub-thresholds (e.g., read-promote threshold (210A), read-throttle threshold (210B), write exclusive threshold (210C)). Each of the different sub-thresholds may be a value designating when to transition to a particular scheme.

In one or more embodiments of the invention, for example, a write-throttle threshold (210A) may indicate when the resources for receiving data on the bus (104) are under-utilized. For example, if the value of the pending read counter is below the read-promote threshold (210A), the resources (e.g., return communication channel and/or receive queue) for receiving data on the bus (104) may be deemed under-utilized. The read-promote threshold may differentiate between when a scheme in which read requests are preferentially issued over write requests is used and a scheme in which no preference is given to either read requests or write requests is used.

In one or more embodiments of the invention, the read-throttle threshold (210B) may indicate when resources for receiving data are over-utilized. For example, if the value of the pending read counter is above the read-throttle threshold, the resources for receiving data may be deemed over-utilized. The read-promote threshold may differentiate between when a scheme in which write requests are preferentially issued over read requests is used and a scheme in which no preference is given to either read requests or write requests is used.

In one or more embodiments of the invention, the write-exclusive threshold (210C) represents a value in which the resource(s) for receiving data is completely saturated. In one or more embodiments of the invention, if the value of the pending read counter is above the write-exclusive threshold, only writes are issued. In such embodiments, the write-exclusive threshold may define when a scheme in which no read requests are issued until a sufficient amount of resource exists to process new read requests.

In one or more embodiments of the invention, an arbitrator (204) is operatively connected to the queues (200A, 200B, 202), the threshold (208), and the pending read counter (206). The arbitrator (204) includes functionality to select the scheme based on the threshold (208) and the pending read counter (206), and transmit requests on the bus based on the selected scheme. The arbitrator may further include functionality to populate the receive queue (202) with received data. Alternatively or additionally, the bus (104) may populate the data and bypass the arbitrator (204).

In one or more embodiments of the invention, the endpoint (108) includes functionality to interface directly with peripheral device logic (210) of the peripheral device (102). Specifically, in one or more embodiments of the invention, the peripheral device logic (102) may include functionality to directly or indirectly populate the read request queue (200A) and the write request queue (200B) and obtain data from the receive queue (202). The peripheral device logic (102) is the hardware, software, and/or firmware of the peripheral device (102).

Additional or alternative sub-thresholds may exist without departing from the scope of the claims. Further, although FIG. 2 shows the components that may exist in the endpoint, alternatively or additionally, the components shown in the endpoint may be in the host without departing from the scope of the invention. In such a scenario, the host may include functionality to control the issuance of read requests and write requests from the host without departing from the scope of the invention.

Figure 3:
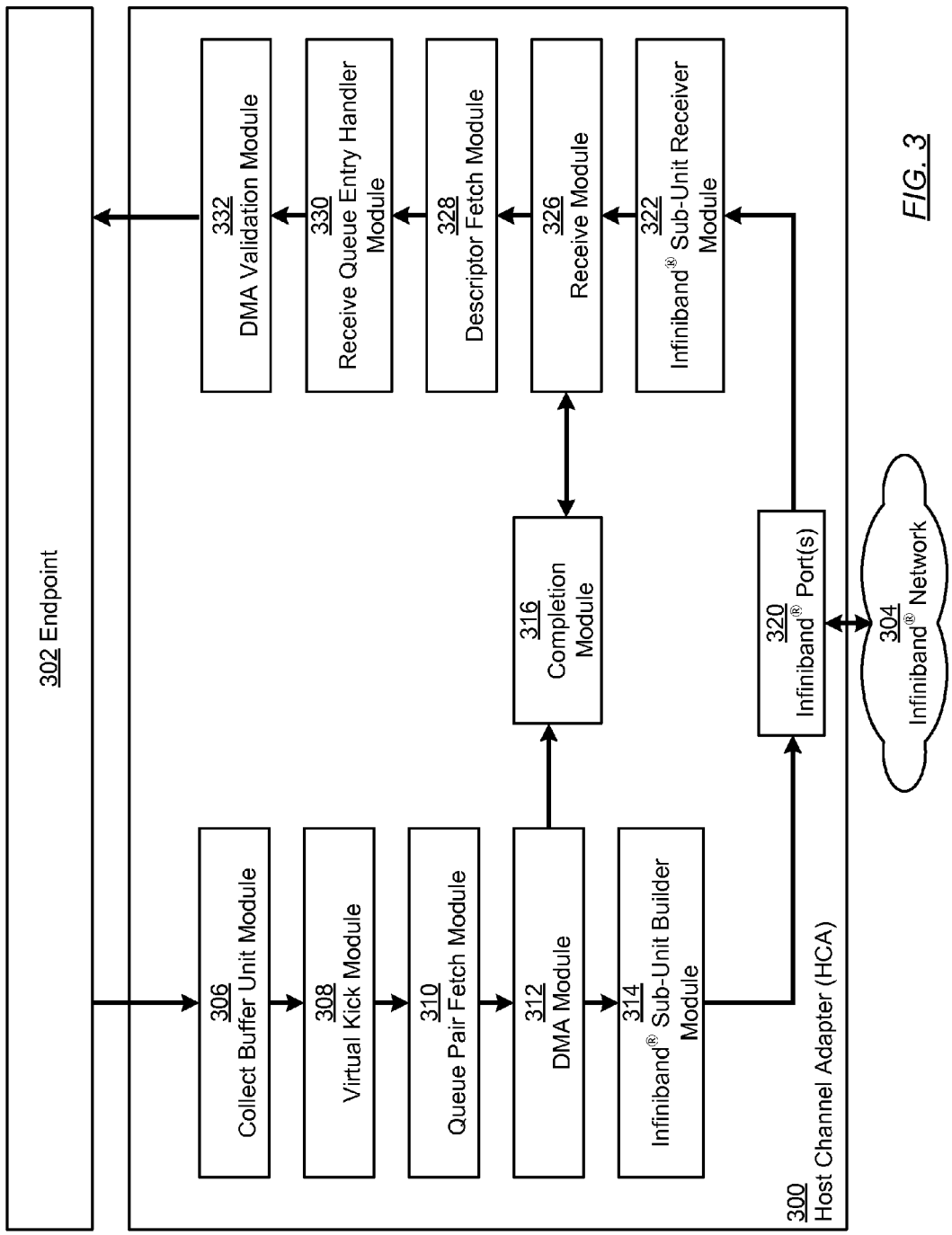
FIG. 3 shows a schematic diagram of a host channel adaptor (HCA) in accordance with one or more embodiments of the invention.

FIG. 3 shows a schematic diagram of a peripheral device when the peripheral device is a host channel adapter (300) which is connected to an endpoint (302) for a peripheral component interconnect express (PCIe) bus and the network is an Infiniband® network (304) in one or more embodiments of the invention.

As shown in FIG. 3, the host channel adapter (300) may include a collect buffer unit module (306), a virtual kick module (308), a queue pair (QP) fetch module (310), a direct memory access (DMA) module (312), an Infiniband® packet builder module (314), one or more Infiniband® ports (320), a completion module (316), an Infiniband® packet receiver module (322), a receive module (326), a descriptor fetch module (328), a receive queue entry handler module (330), and a DMA validation module (332). The respective modules correspond to both transmitting processing logic for sending messages on the Infiniband® network (304) and receiving processing logic for receiving messages from the Infiniband® network (304). In one or more embodiments of the invention, the collect buffer unit module (306), virtual kick module (308), QP fetch module (310), direct memory access (DMA) module (312), Infiniband® packet builder module (314), and completion module (316) may be components of the transmitting processing logic. The completion module (316), Infiniband® packet receiver module (322), receive module (326), descriptor fetch module (328), receive queue entry handler module (330), and DMA validation module (332) may be components of the receiving processing logic. As shown, the completion module (316) may be considered a component of both the transmitting processing logic and the receiving processing logic in one or more embodiments of the invention.

In one or more embodiments of the invention, each module may correspond to hardware and/or firmware. Each module is configured to process data units. Each module may include functionality to produce or obtain all or part of the data units. All or part of the data units may be stored in a memory of a host system. Each of the modules may include functionality to access the memory of the host system via read requests and write requests sent to the host system over a bus. Each data unit corresponds to a command or a received message or packet for transmitting on the Infiniband network. For example, a data unit may be the command, an address of a location on the communication adapter storing the command, a portion of a message corresponding to the command, a packet, an identifier of a packet, or any other identifier corresponding to a command, a portion of a command, a message, or a portion of a message. A command or received message may be considered a work request.

The dark arrows between modules show the transmission path of data units between modules as part of processing work requests and received messages in one or more embodiments of the invention. Data units may have other transmission paths (not shown) without departing from the invention. Further, other communication channels and/or additional components of the host channel adapter (300) may exist without departing from the invention. Specifically, each of the modules may include functionality to independently communicate with the endpoint (302) in order to access the memory of the host system over the bus. Alternately, a different specific module (not shown) of the HCA (300) may manage sending read and write requests to the endpoint and populating data structures on the HCA. Each of the components of the resource pool is discussed below.

The collect buffer controller module (306) includes functionality to receive work request data from the host and store the work request data on the host channel adapter. When the work request is received, the collect buffer controller module is configured to issue a kick that indicates that the work request is received. The collect buffer controller module (306) may issue a read request to the endpoint to read the work request data from host memory. Alternatively, the host memory may independently write the work request to the buffer.

In one or more embodiments of the invention, the virtual kick module (308) includes functionality to load balance work requests received from applications. Specifically, the virtual kick module is configured to initiate execution of work requests through the remainder of the transmitting processing logic in accordance with a load balancing protocol.

In one or more embodiments of the invention, the QP fetch module (310) includes functionality to obtain QP status information for the QP corresponding to the data unit. Specifically, per the Infiniband® protocol, the message has a corresponding send queue and a receive queue. The send queue and receive queue form a QP. Accordingly, the QP corresponding to the message is the QP corresponding to the data unit in one or more embodiments of the invention. The QP state information may include, for example, sequence number, address of remote receive queue/send queue, whether the QP is allowed to send or allowed to receive, and other state information. In one embodiment of the invention, the QPs and data describing the QPs are stored in the memory of the host system. The QP fetch module retrieves QP information by issuing read requests to the read request queue in the endpoint. When the read requests are the next to be issued, the arbitrator issues the read request over the bus using the endpoint (302). Similarly, the QP information may be updated using write requests stored in the write request queue.

In one or more embodiments of the invention, the DMA module (312) includes functionality to perform DMA with host memory. The DMA module may include functionality to determine whether a work request in a data unit or referenced by a data unit identifies a location in host memory that includes payload, to validate that the process sending the work request has necessary permissions to access the location, and to obtain the payload from the host memory, and store the payload in the DMA memory on the HCA. In one embodiment of the invention, DMAs are performed via the issue of read and write requests over the bus by the DMA module (312). Specifically, the DMA module may issue the read requests and write requests to the read request queue and the write request queue, respectively, in order to store and retrieve data from the host memory.

Continuing with FIG. 3, in one or more embodiments of the invention, the DMA module (312) is connected to an Infiniband® packet builder module (314). In one or more embodiments of the invention, the Infiniband® packet builder module includes functionality to generate one or more packets for each data unit and to initiate transmission of the one or more packets on the Infiniband® network (304) via the Infiniband® port(s) (320). In one or more embodiments of the invention, the Infiniband® packet builder module may include functionality to obtain the payload from a buffer corresponding to the data unit, from the host memory, and from an embedded processor subsystem memory. The Infiniband® packet builder module may obtain the data similar to the DMA module obtaining the data using the endpoint.

In one or more embodiments of the invention, the completion module (316) includes functionality to generate completions for work requests. For example, the completion module may include functionality to manage packets for QPs set in reliable transmission mode.

In one or more embodiments of the invention, the Infiniband packet receiver module (322) includes functionality to receive packets from the Infiniband® port(s) (320). In one or more embodiments of the invention, the Infiniband® packet receiver module (322) includes functionality to perform a checksum to verify that the packet is correct, parse the headers of the received packets, and place the payload of the packet in memory. In one or more embodiments of the invention, the Infiniband® packet receiver module (322) places the payload in memory by issuing one or more write requests, which include the payload, to the write request queue. Based on the arbitration scheme, the arbitrator issues the write requests via the bus. In one or more embodiments of the invention, the Infiniband® packet receiver module (322) includes functionality to obtain the QP state for each packet from a QP state cache, and to transmit a data unit for each packet to the receive module (326) for further processing.

In one or more embodiments of the invention, the receive module (326) includes functionality to validate the QP state obtained for the packet. The receive module (326) includes functionality to determine whether the packet should be accepted for processing. In one or more embodiments of the invention, if the packet corresponds to an acknowledgement or an error message for a packet sent by the host channel adapter (300), the receive module includes functionality to update the completion module (316).

Additionally or alternatively, the receive module (326) includes a queue that includes functionality to store data units waiting for one or more reference to buffer location(s) or waiting for transmission to a next module. Specifically, when a process in a virtual machine is waiting for data associated with a QP, the process may create receive queue entries that reference one or more buffer locations in host memory in one or more embodiments of the invention. For each data unit in the receive module, the receive module includes functionality to identify the receive queue entries from a host channel adapter cache or from host memory, and associate the identifiers of the receive queue entries with the data unit. In order to access the buffers, the receive module (326) may issue read and write requests to the respective queues, and the arbitrator to issue the requests according to the arbitration scheme.

In one or more embodiments of the invention, the descriptor fetch module (328) includes functionality to obtain descriptors for processing a data unit. For example, the descriptor fetch module may include functionality to obtain descriptors for a receive queue, a shared receive queue, a ring buffer, and the completion queue (CQ). The descriptor fetch module may issue read requests to the read request queue to obtain the descriptors, and the arbitrator to issue the read requests according to the arbitration scheme.

In one or more embodiments of the invention, the receive queue entry handler module (330) includes functionality to obtain the contents of the receive queue entries. In one or more embodiments of the invention, the receive queue entry handler module (330) includes functionality to identify the location of the receive queue entry corresponding to the data unit and obtain the buffer references in the receive queue entry. In one or more embodiments of the invention, the receive queue entry may be located on a cache of the host channel adapter (300) or in host memory, in which case the receive queue entry is retrieved via a read request issued to the read request queue.

In one or more embodiments of the invention, the DMA validation module (332) includes functionality to perform DMA validation and initiate DMA between the host channel adapter and the host memory. The DMA validation module includes functionality to confirm that the remote process that sent the packet has permission to write to the buffer(s) referenced by the buffer references, and confirm that the address and the size of the buffer(s) match the address and size of the memory region referenced in the packet. Further, in one or more embodiments of the invention, the DMA validation module (332) includes functionality to initiate DMA with host memory when the DMA is validated.

As discussed above, the various modules and components of the HCA (300) connect to a PCI Express bus endpoint (302). The host channel adaptor (300) may use the connection to access the memory of the host system. Additionally, the host system may also use the connection to directly read and write data to the HCA (300). Specifically, the PCI Express bus endpoint (302) shown in FIG. 3 may include the components discussed above with reference to FIG. 2. The access to the memory of the host system may be used both for meta-data used by the various modules such as obtaining queue pair information and queue descriptors as well as the packets that are transmitted and received over the InfiniBand network. For example, one or more modules may issue read requests to the PCI Express bus endpoint (302) to read QP state information, queue descriptors, or any of the other data structures described above for transmission of packets on the Infiniband network, and other information from memory of the host system. By way of another example, one or more modules may issue write requests to the PCI Express bus endpoint (302) to update QP state information, queue descriptors, packet data received from the Infiniband network, and other information to memory of the host system. In one embodiment of the invention, the various accesses to memory of the host system by the different modules may be managed using architecture discussed in the description of FIG. 2 above and the methods described below.

Figure 4:
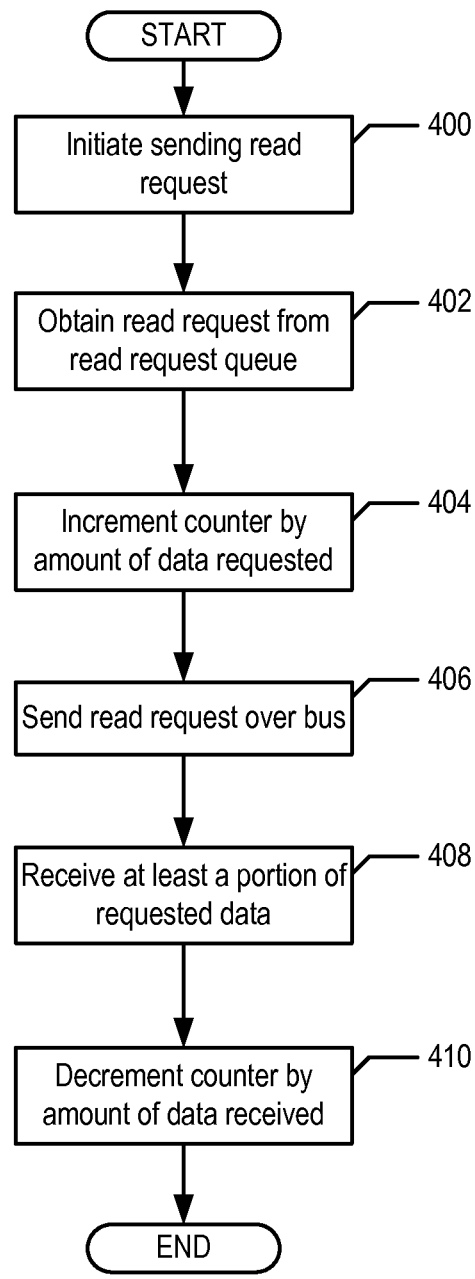
FIG. 4 show a flowchart for managing the pending read counter in accordance with one or more embodiments of the invention.

FIG. 4 shows a method for managing the pending read counter in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In Step 400, sending a read request is initiated in one or more embodiments of the invention. For example, logic on the peripheral device or host may store data in the read request queue for transmission on the bus. When the read request is the next read request to be sent, the arbitrator may determine that the read request should be sent on the bus based on the currently selected scheme (discussed below). Specifically, in one or more embodiments of the invention, the schemes dictate different ratios of read requests and write requests to be issued. In alternate embodiments of the invention, the arbitrator may seek to maintain the pending read counter at a specific amount of data, and may therefore issue read requests when the pending read counter drops below a certain level. In one or more embodiments of the invention, the arbitrator may check the amount of data being requested in a read request in order to determine if the read request may be issued.

In Step 402, a read request is obtained from the read request queue by the arbitrator. In one or more embodiments of the invention, the read request issued is the oldest read request on the queue. Alternately, the arbitrator may employ a scheme, which seeks to balance the size of read requests with age. For example, if the difference between the pending read counter and the next threshold is below a certain amount, the arbitrator may prefer to issue a read request small enough to stay under the threshold even though such read request is not the oldest read request in the read request queue. Alternatively or additionally, the arbitrator may also add increasing weight to older items on the queue to ensure that large read requests are not continuously passed over. In one or more embodiments of the invention, other mechanisms may be used. For example, the peripheral device may assign a priority value to read requests in the queue, which the arbitrator defers to when issuing them.

In Step 404, the pending read counter is incremented by the amount of data specified by the read request. Specifically, the amount of requested data is identified. The pending read counter is incremented according to the identified amount of requested data. In one or more embodiments of the invention, the counter may not count the exact amount of data requested, but may rather use another metric relevant to the system. For example, if requested data is received in fixed size portions, and the requested data of a read request is for only enough data to fill two and a half portions, the counter may be incremented by three, as the requested data will be received in three distinct portions.

In Step 406, the read request is sent by the arbitrator over the bus. In one or more embodiments of the invention, sending the read request over the bus includes transmitting the read request via one or more unidirectional communication channels. In one or more embodiments of the invention, the read request is written to a buffer located in the root complex. If the bus includes multiple communication channels, the data included in one read request may be written in parallel. Alternately, multiple requests may be written on different communication channels simultaneously.

In Step 408, at least a portion of the data requested by the read request is received over the bus. As mentioned previously, the requested data may be received in a fixed-size portion. The data might also be received in a continuous stream, rather than in fixed-sized portions. In one or more embodiments of the invention, the data corresponding to a single read request may be received in a single block. Depending on the number of return communication channels of the bus, the different portions of the data received in response to a single read request may arrive in parallel. Alternately, multiple requests may be responded to simultaneously. In one or more embodiments of the invention, the received data may not be considered received until the received data has been read from the receive queue by the peripheral device.

In Step 410, the pending read counter is decremented by an amount corresponding to the size of the portion of the data received. The pending read counter may be decremented when the received data is written to the receive queue or the pending read counter may be decremented when the data is read from the receive queue. As in Step 404, the counter may not be decrement by the exact amount of data received, but may instead by decremented by an amount corresponding to the structure of data received.

Figure 5:
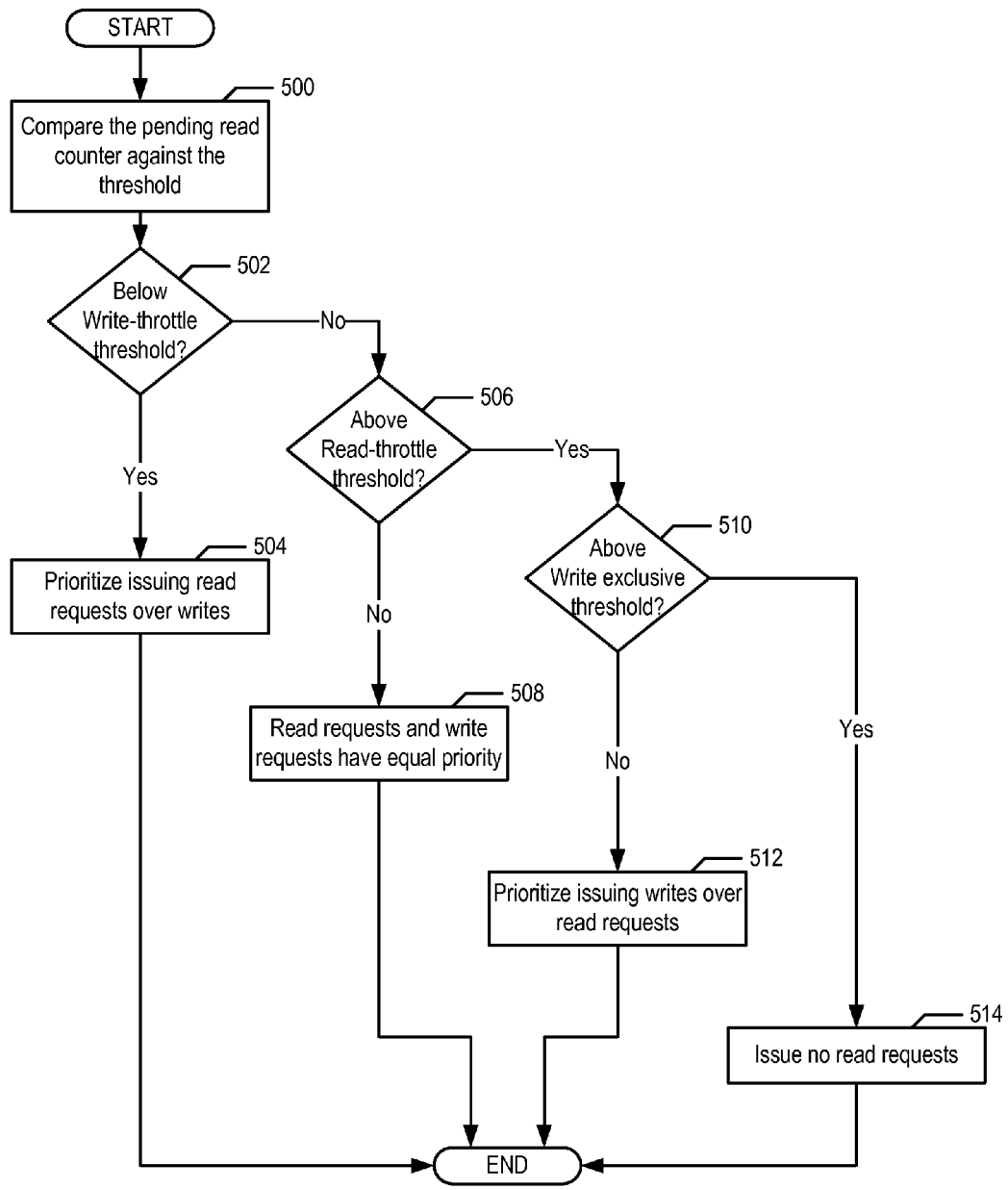
FIG. 5 shows a flowchart for managing utilization of the bus in accordance with one or more embodiments of the invention.

FIG. 5 shows a method for determining a scheme for managing utilization of bus resources in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In Step 500, the pending read counter is compared against the values of the threshold. In one or more embodiments of the invention, the comparison is performed by the arbitrator every time a request is sent. Alternatively or additionally, the comparison may be performed on a periodic basis, such as after every five read requests or five requests. Alternately, the comparison may be made after every update to the pending read counter, with the arbitrator selecting a read request or write request based upon the current scheme, and the current scheme only changing when a threshold is met and/or exceeded. Based on the comparison, the arbitrator determines the scheme by which to select whether a read request or a write request should be sent next.

In Step 502, a determination is made as to whether the pending read counter is below the read-promote threshold. Specifically, a determination is made whether the value of the pending read counter is below the value of the read-promote threshold. Alternatively or additionally, the determination may be based on whether the values are equal to each other without departing from the scope of the claims. In Step 504, if the pending read counter is below the read-promote threshold, the arbitrator will preferentially issue read requests. As discussed above, the read-promote threshold represents the point at which there is unused bandwidth available to receive data. If the read pending counter drops below the read-promote threshold, the system may begin issuing additional read requests at the expense of write requests to increase the volume of data being requested, and thus the amount of data received over the bus. By issuing a higher ratio of read requests to write requests, the arbitrator maximizes usage of available resources, and potentially mitigates future bottlenecks relating to receiving data. In one or more embodiments of the invention, the ratio of read requests to write requests may be X to Y where X is greater than Y. For example, X may be ten and Y may be three. In such an example scenario, for every ten read requests issued, three write requests are issued. The ratio may be different without departing from the scope of the invention. Further, in one or more embodiments of the invention, the ratio may be configurable. For example, the arbitrator may be configured with the ratios for the different schemes.

In Step 506, a determination is made as to whether the pending read counter is above the read-throttle threshold. Specifically, a determination is made whether the value of the pending read counter is above the value of the read-throttle threshold. Alternatively or additionally, the determination may be based on whether the values are equal to each other without departing from the scope of the claims. If the pending read counter is below the read throttle threshold, then the pending read counter is not below the read-promote threshold and is below the read-throttle threshold and the usage of the bus is balanced. In such a scenario, in Step 508, the arbitrator issues read requests and write requests with equal priority. In other words, in one or more embodiments of the invention, the ratio of read requests to write requests may be 1 to 1. Alternatively or additionally, the arbitrator may not actively balance the read requests and write requests to manage bus resources. For example, the arbitrator may select use a different attribute, such as length of time in the queue, to select the request to send regardless of whether the request is a read request or write request. In one embodiment of the invention, the communication channels used to service read requests may be shared by direct writes from the host to the peripheral device, which may be taken into account when calculating or utilizing the various threshold values.

In Step 510, a determination is made as to whether the pending read counter is above the write-exclusive threshold. Specifically, a determination is made whether the value of the pending read counter is above the value of the write-exclusive threshold. Alternatively or additionally, the determination may be based on whether the values are equal to each other without departing from the scope of the claims. In Step 512, if the pending read counter is above the read-throttle threshold, and below the write-exclusive threshold, the arbitrator will preferentially issue write requests. As discussed above, the read-throttle threshold represents the point at which the rate that data is being requested exceeds the capacity of the bus to deliver the requested data. Throttling read requests decrease the volume of data being requested, and thus the more write requests may be issued while maintaining the same volume of read requests. In one or more embodiments of the invention, throttling read requests may include issuing a greater number of write requests than read requests. In one or more embodiments of the invention, the ratio of write requests to read requests may be X to Y where X is greater than Y. For example, X may be ten and Y may be three. In such an example scenario, for every ten write requests issued, three read requests are issued. The ratio may be different without departing from the scope of the invention. Further, in one or more embodiments of the invention, the ratio may be configurable. For example, the arbitrator may be configured with the ratios for the different schemes.

In Step 514, if the pending read counter is above the write-exclusive threshold, the arbitrator will issue no read requests in one or more embodiments of the invention. In such a scenario, the arbitrator issues only write requests in one or more embodiments of the invention. By issuing only write requests, the arbitrator allows for resources used to receive data to be freed and already issued read requests are able to be processed. In addition to managing bandwidth for read requests, various aforementioned thresholds may also be used to manage bandwidth for incoming writes to the peripheral device, to reduce the read load on the memory of the host, and to facilitate the sharing of the bus with other peripheral devices.

The above bus bandwidth management system may be implemented, for example, in the architecture described in U.S. patent application Ser. No. 13/721,671, and entitled "DISTRIBUTED QUEUE PAIR STATE ON A HOST CHANNEL ADAPTER." U.S. patent application Ser. No. 13/721,671 is incorporated herein by reference in its entirety. In the aforementioned architecture, the titular queue pair states as well as the queue pairs themselves, the data packets being sent with the queue pairs, and any other associated meta-data may be the data be written and read from the memory of the host system over the bus.

As another example, the bus bandwidth management system may be implemented, for example, in the architecture described in U.S. patent application Ser. No. 13/721,699, and entitled "METHOD AND SYSTEM FOR QUEUE DESCRIPTOR CACHE MANAGEMENT FOR A HOST CHANNEL ADAPTER." U.S. patent application Ser. No. 13/721,699, is incorporated herein by reference in its entirety. In the architecture of U.S. patent application Ser. No. 13/721,699, the reads and writes to the memory of the host system may include the queue descriptors, queues, and other meta-data required by the HCA, in addition to the actual data packets to be sent.

Figure 6:
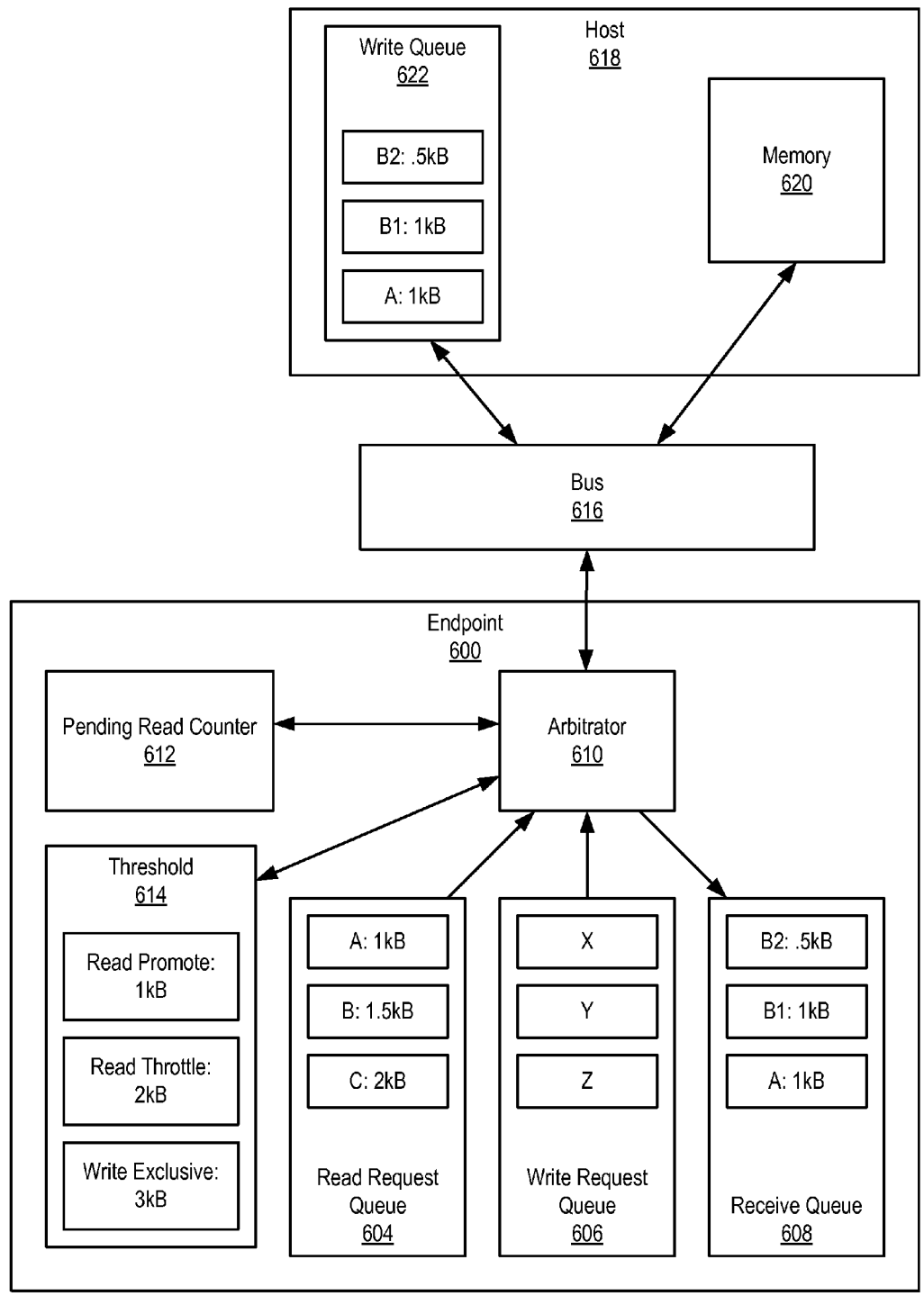
FIG. 6 shows an example for using the bus utilization management system in accordance with one or more embodiments of the invention.

The following example is for example purposes only and not intended to limit the scope of the claims. FIG. 6 shows an example for using the bus utilization management system in accordance with one or more embodiments of the invention. In the example an endpoint (600) of a bus (616) includes a read request queue (604), a write request queue (606), a receive queue (608), an arbitrator (610), a pending read counter (612) and a threshold (614). The bus (616) is connected to a host system (618). A memory (620) stored in the host system stores data required by a peripheral device of which the endpoint is part. The host system (618) also includes a write queue (622) which includes data to be written directly from the host system (618) to the peripheral device. The write queue (622) initially stores a single data item (N) to be written to the peripheral device via the queue. The read request queue (604) initially stores three read requests (A-C) and the write request queue (606) initially stores three write requests (X-Z). The receive queue (608) is initially empty, the pending read counter (612) is initially zero, and the threshold (614) includes a 1 kilobyte (kB) read-promote threshold, a 2 kB read-throttle threshold, and a 3 kB write-exclusive threshold.

The arbitrator (610) initially compares the threshold (614) and the pending read counter (612). As the result of the comparison the scheme used to manage the bus is the read-promote scheme, since the value of the pending read counter (612) is below 1 kB. Following the scheme the arbitrator (610) pops the top of the read request queue (604) and issues read request A on the bus (616). The pending read counter is incremented by 1 kB, the amount of data requested by read request A.

Because the pending read counter (612) was altered, the arbitrator (610) again compares the pending read counter (612) and the threshold (614). The pending read counter (612), now with the value 1 kB, is still below the read-promote threshold, so the arbitrator (610) proceeds to issue read request B. The pending read counter (612) is incremented by the amount of data requested by read request B (i.e., 1.5 kB), resulting in a value of 2.5 kB for the pending read counter (612). In this time frame, the arbitrator (610) also receives the data requested by read request A, and writes it to the receive queue (608). The arbitrator (610) decrements the pending read counter (612) by the amount of data received, 1 kB. Thus, the value of the pending read counter (612) is now 1.5 kB.

Because the pending read counter (612) was altered, the arbitrator (610) again compares the pending read counter (612) and the threshold (614). Because the value of the pending read counter (612), 1.5 kB exceeds the read-promote threshold, the arbitrator (610) stops using the read-promote scheme.

Because the arbitrator (610) no longer favors read requests, write request X is issued next, followed by read request C. The pending read counter (612) is incremented by the amount of data requested in read request C, 2 kB, resulting in the value of the pending read counter (612) becoming 3.5 kB.

The pending read counter (612) is again compared against the threshold (614). Because the value of the pending read counter (612), 3.5 kB, now exceeds the write-exclusive threshold of 3 kB, the arbitrator (610) selects which requests to issue based on the write-exclusive scheme. Thus, no read requests are issued from the read request queue (604). Therefore, the next request issued is write request Y. In the meantime, data item N, unaffected by the write-exclusive scheme is sent to the endpoint (600) over the bus. Data item N is received and written to the receive queue (608). However, because the data received was not in response to a read request, the pending read counter is not altered.

Next, a first portion of the data requested in read request B is received by the arbitrator (610), and written to the receive queue (608). In this example, the maximum size of data that may be sent over the bus is 1 kB, so the 1.5 kB of data requested in read request B was split into multiple portions in order to be sent over the bus. The pending read counter (612) is decremented by the size of the received portion, and is now 2.5 kB.

Because the pending read counter (612) was altered, the arbitrator (610) again compares the pending read counter (612) and the threshold (614). The pending read counter (612), now with the value 2.5 kB, is below the write-exclusive threshold of 3 kB, so the arbitrator (610) adopts the read-throttle scheme of bus management.

Since the read-throttle scheme still preferentially sends write requests, write request Z is the next issued. At this time, the second portion of the data requested in read request B is received. Thus, the pending read counter (612) is decremented by the amount of the second portion, and now has a value of 2 kB. Since this value is at the read-throttle threshold, the arbitrator (610) does not change schemes.

As shown by way of the example, embodiments of the invention assist in fully using resources for receiving data. Specifically, the use of the pending read counter and the threshold assists to ensure that the return communication channel and receive queue are fully used without exceeding capacity in one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing bandwidth of a bus connecting a peripheral device to a host system, comprising:
   sending, by the peripheral device and over the bus, a first request to the host system, wherein the first request comprises a first read request identifying requested data to be read from a memory of the host system;
   incrementing, in response to sending the first read request, a pending read counter by an amount corresponding to the requested data;
   receiving, in response to sending the first read request, at least a portion of the requested data from the host system;
   decrementing, in response to receiving the at least the portion of the requested data, the pending read counter by an amount corresponding to the at least the portion of the requested data;
   comparing the counter and a threshold to obtain a result;
   selecting, based on the result, a scheme from a plurality of schemes for managing the bandwidth of the bus, wherein the scheme specifies a ratio of read requests and write requests to be sent on the bus; and
   sending, based on the scheme, a second request, wherein the second request is one selected from a group consisting of a write request and a second read request, wherein the write request comprises data to be written to the memory of the host system.

2. The method of claim 1, further comprising:
   scheduling, by the peripheral device, additional read requests by adding the additional read requests to a read request queue;
   scheduling, by the peripheral device, additional write requests by adding the additional write requests to a write request queue; and
   accessing, based on the scheme, the read request queue and the write request queue to obtain the second request.

3. The method of 1, wherein the threshold comprises a plurality of sub-thresholds corresponding to the plurality of schemes for managing utilization of the bus.

4. The method of claim 3, wherein the plurality of sub-thresholds comprises:
   a read-promote threshold corresponding to a read-promote scheme; and
   a read-throttle threshold corresponding to a read-throttle scheme.

5. The method of claim 4, further comprising:
   sending a greater number of read requests than write requests when the pending read counter is below the read-promote threshold;

sending an equal number of read requests and write requests when the pending read counter exceeds the read-promote threshold and is below the read-throttle threshold; and sending a greater number of write requests than read requests when the pending read counter exceeds the read-throttle threshold.

6. The method of claim 5, wherein the plurality of sub-thresholds further comprises a write-exclusive threshold corresponding to a write-exclusive scheme, and wherein no read requests are sent when the pending read counter exceeds the write-exclusive threshold.

7. The method of claim 1, further comprising:

receiving, over a network connection of the peripheral device, a first data packet;

writing, by the peripheral device issuing the write request, the first data packet to the host system;

obtaining, by the peripheral device in response to issuing the read request, a second data packet; and sending, by the peripheral device, the second data packet over the network connection of the peripheral device.

8. The method of claim 6, wherein the peripheral device is a host channel adaptor (HCA) for an Infiniband® link.

9. A peripheral device, comprising:

an endpoint comprising:
a pending read counter;
a threshold; and
an arbitrator, configured to:
send a first request over the bus, wherein the first request comprises a first read request identifying requested data to be read;
increment, in response to sending the first read request, the pending read counter by an amount corresponding to the requested data;
receive, in response to the first read request and over the bus, at least a portion of the requested data;
decrement, in response to sending the read request, the pending read counter by an amount corresponding to the at least the portion of the requested data;
compare the pending read counter and the threshold to obtain a result;
select, based on the result, a scheme of a plurality of schemes specifying a ratio of read requests and write requests; and
send, based on the scheme, a second request, wherein the second request is one selected from a group consisting of a write request and a second read request, wherein the write request comprises data to be written; and a peripheral device logic, communicatively connected to the endpoint, and configured to issue the first read request, the second read request, and the write request to the endpoint.

10. The peripheral device of claim 9, wherein the peripheral device logic issues read requests and write requests to access memory connected to the bus.

11. The peripheral device of claim 10, wherein the endpoint further comprises:

a write request queue, configured to store unsent write requests; and a read request queue, configured to store unsent read requests.

12. The peripheral device of claim 11, wherein the arbitrator is further configured to:

access, based on the scheme, the read request queue and the write request queue to obtain the request.

13. The peripheral device of claim 10, wherein the threshold comprises a plurality of sub-thresholds corresponding to the plurality of schemes for managing utilization of the bus.

14. The peripheral device of claim 13, wherein the plurality of sub-thresholds comprises:

a read-promote threshold corresponding to a read-promote scheme; and a read-throttle threshold corresponding to a read-throttle scheme.

15. The peripheral device of claim 14, wherein the arbitrator is further configured to:

send a greater number of read requests than write requests when the pending read counter is below the read-promote threshold;

send an equal number of read requests and write requests when the pending read counter exceeds the read-promote threshold and is below the read-throttle threshold; and send a greater number of write requests than read requests when the pending read counter exceeds the read-throttle threshold.

16. The peripheral device of claim 15, wherein the plurality of sub-thresholds further comprises a write-exclusive threshold corresponding to a write-exclusive scheme, and wherein no read requests are sent when the pending read counter exceeds the write-exclusive threshold.

17. The peripheral device of claim 9, wherein the peripheral device is a HCA for an Infiniband® link, and wherein the peripheral device logic is configured to send and receive data packets over the Infiniband® link.

18. A system comprising:

a host system, comprising:
a computer processor; and
memory;

a bus, comprising:
a root complex, located in the host system and configured to communicate with the host system; and a peripheral device, comprising:
an endpoint of a bus comprising:
a pending read counter;
a threshold; and
an arbitrator, configured to:
send a first request over the bus, wherein the first request comprises a first read request identifying requested data to be read;
increment, in response to sending the first read request, the pending read counter by an amount corresponding to the requested data;
receive, in response to the first read request and over the bus, at least a portion of the requested data;
decrement, in response to sending the read request, the pending read counter by an amount corresponding to the at least the portion of the requested data;
compare the pending read counter and the threshold to obtain a result;
select, based on the result, a scheme of a plurality of schemes specifying a ratio of read requests and write requests; and
send, based on the scheme, a second request, wherein the second request is one selected from a group consisting of a write request and a second read request, wherein the write request comprises data to be written; and a peripheral device logic, communicatively connected to the endpoint, and configured to issue the first read request, the second read request, and the write request to the endpoint.

19. The system of claim 18, wherein the threshold comprises:
a read-promote threshold corresponding to a read-promote scheme; and
a read-throttle threshold corresponding to a read-throttle scheme.

20. The system of claim 19, wherein the threshold further comprises
a write exclusive threshold corresponding to a write-exclusive scheme, and
wherein no read requests are sent when the pending read counter exceeds the value corresponding to the write-exclusive threshold.

* * * * *